(12) United States Patent
Kinoshita et al.

(10) Patent No.: US 12,098,264 B2
(45) Date of Patent: Sep. 24, 2024

(54) GAS-BARRIER COMPOSITION

(71) Applicant: TOYO SEIKAN GROUP HOLDINGS, LTD., Tokyo (JP)

(72) Inventors: Yuuki Kinoshita, Yokohama (JP); Hideaki Nagahama, Yokohama (JP); Toshiki Yamada, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 702 days.

(21) Appl. No.: 17/285,646

(22) PCT Filed: Oct. 9, 2019

(86) PCT No.: PCT/JP2019/039790
§ 371 (c)(1),
(2) Date: Apr. 15, 2021

(87) PCT Pub. No.: WO2020/085090
PCT Pub. Date: Apr. 30, 2020

(65) Prior Publication Data
US 2021/0395495 A1 Dec. 23, 2021

(30) Foreign Application Priority Data
Oct. 22, 2018 (JP) ................ 2018-198537

(51) Int. Cl.
| | |
|---|---|
| *C08L 1/16* | (2006.01) |
| *C08J 5/12* | (2006.01) |
| *C08J 7/048* | (2020.01) |
| *C08K 3/34* | (2006.01) |
| *C08K 5/00* | (2006.01) |
| *C08K 5/092* | (2006.01) |
| *C08L 29/04* | (2006.01) |
| *C08L 79/02* | (2006.01) |

(52) U.S. Cl.
CPC ............. *C08L 1/16* (2013.01); *C08J 5/124* (2013.01); *C08J 7/048* (2020.01); *C08K 3/34* (2013.01); *C08K 5/0025* (2013.01); *C08K 5/092* (2013.01); *C08L 29/04* (2013.01); *C08L 79/02* (2013.01); *C08J 2379/02* (2013.01); *C08J 2401/16* (2013.01); *C08K 2201/011* (2013.01); *C08L 2201/14* (2013.01); *C08L 2203/16* (2013.01); *C08L 2205/16* (2013.01)

(58) Field of Classification Search
CPC .. C08L 1/16; C08L 29/04; C08L 79/02; C08L 2201/14; C08L 2203/16; C08L 2205/16; C08J 7/048; C08J 5/124; C08J 2401/16; C08K 3/34; C08K 5/0025; C08K 5/092; C08K 2201/011
See application file for complete search history.

(56) References Cited

U.S. PATENT DOCUMENTS

| | | | |
|---|---|---|---|
| 2009/0324836 A1 | 12/2009 | Tsurugi et al. | |
| 2011/0281487 A1 | 11/2011 | Mukai et al. | |
| 2012/0237761 A1 | 9/2012 | Mukai et al. | |
| 2012/0321227 A1 | 12/2012 | Kumamoto et al. | |
| 2013/0131332 A1 | 5/2013 | Shoseyov et al. | |
| 2015/0368498 A1* | 12/2015 | Okuyama | C08J 7/048 |
| | | | 524/556 |
| 2021/0301095 A1 | 9/2021 | Sakai et al. | |

FOREIGN PATENT DOCUMENTS

| | | | | |
|---|---|---|---|---|
| CN | 101528783 A | 9/2009 | | |
| CN | 103124744 A | 5/2013 | | |
| CN | 106832704 A | 6/2017 | | |
| JP | 2010-218742 A | 9/2010 | | |
| JP | 2011-224545 A | 11/2011 | | |
| JP | 2012-041489 A | 3/2012 | | |
| JP | 2012-97236 A | 5/2012 | | |
| JP | 5064479 B2 | 10/2012 | | |
| JP | 2013-229325 A | 11/2013 | | |
| JP | 2014-015703 A | 1/2014 | | |
| JP | 2016-11392 A | 1/2016 | | |
| JP | 2017-136814 A | 8/2017 | | |
| JP | 6226096 B1 * | 11/2017 | ........... | C09D 129/04 |
| WO | 2010/074340 A1 | 7/2010 | | |
| WO | 2011/065371 A1 | 6/2011 | | |
| WO | 2014/181560 A1 | 11/2014 | | |
| WO | 2017/199252 A1 | 11/2017 | | |
| WO | 2018/008735 A1 | 1/2018 | | |
| WO | 2018/012629 A1 | 1/2018 | | |

OTHER PUBLICATIONS

Clarivate Analytics machine translation of JP 6226096 B1, to Fujihashi et al. published Nov. 8, 2017 (Year: 2017).*
Clarivate Analytics machine translation of JP 2017136814 A, to Fushimi et al., published Aug. 10, 2017 (Year: 2017).*
International Search Report for PCT/JP2019/039790, dated Dec. 24, 2019.
Junka et al., "Titrimetric methods for the determination of surface and total charge of functionalized nanofibrillated/microfibrillated cellulose (NFC/MFC)", Cellulose, 2013, vol. 20, pp. 2887-2895 (9 pages total).
Jost, "Cellulosic Materials at Alberta Innovates-Technology Futures", Seventh Annual Pacific Rim Summit on Industrial Biotechnology and Bioenergy, Oct. 10, 2021 (17 pages total).
Extended European Search Report issued Jul. 6, 2022 in European Application No. 19875636.3.
Office Action issued Aug. 2, 2022 in Chinese Application No. 201980069702.6.
Li et al., "Preparation and Properties of Poly(Vinyl Alcohol) Films Modified by Nanocrystalline Cellulose and Citric Acid", Polymer Materials Science and Engineering, Aug. 2012, vol. 28, No. 8, pp. 178-182 (6 pages total).

(Continued)

Primary Examiner — Jane L Stanley
(74) Attorney, Agent, or Firm — Sughrue Mion, PLLC

(57) ABSTRACT

A gas-barrier composition including nanocellulose containing at least one of a sulfuric acid group, a sulfo group, or a phosphoric acid group; and a reactive crosslinking agent.

9 Claims, 1 Drawing Sheet

(56) References Cited

OTHER PUBLICATIONS

Jacobs H. Jordan, et al., "Alkali Hydrolysis of Sulfated Cellulose Nanocrystals: Optimization of Reaction Conditions and Tailored Surface Charge", Nanomaterials, MDPI, vol. 9, No. 9, Aug. 30, 2019, (15 pages).
Extended European Search Report dated Nov. 8, 2023 in corresponding Application No. 19 875 636.3.

* cited by examiner

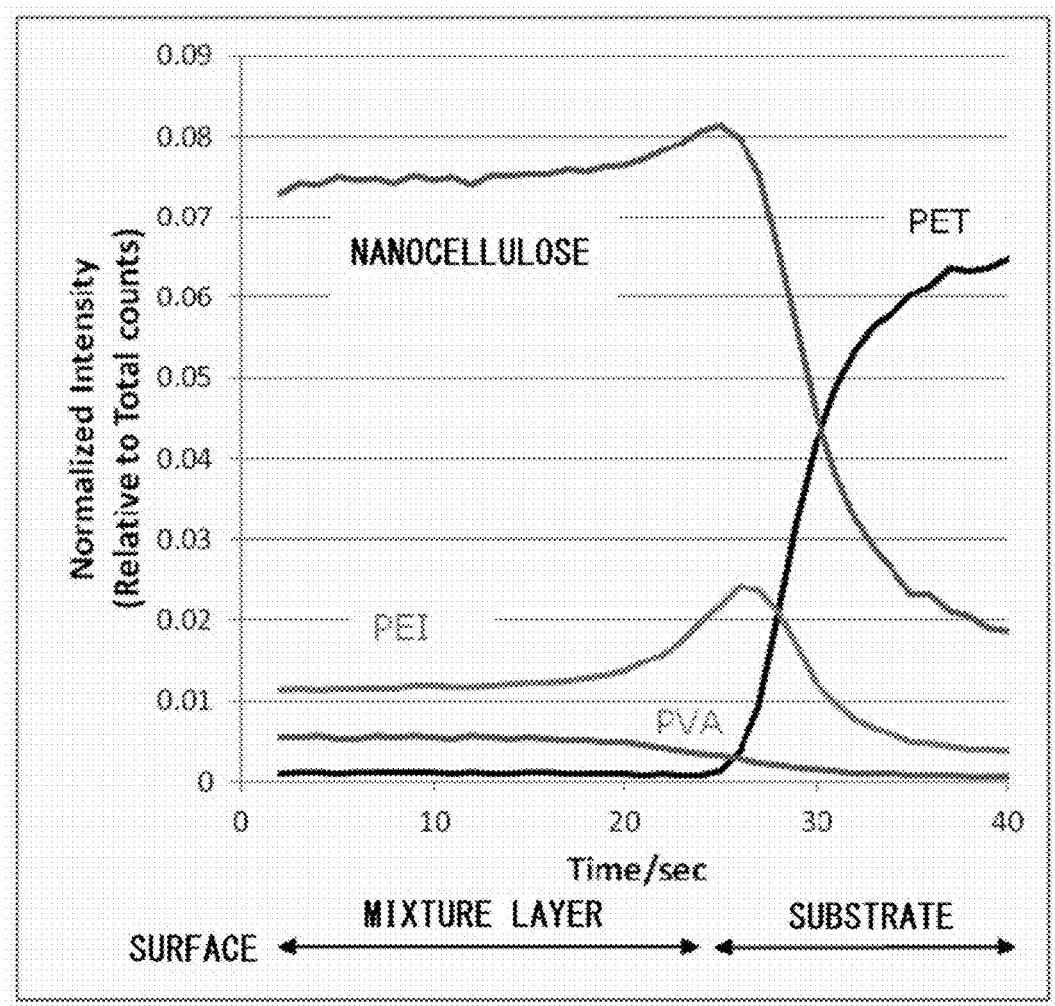

GAS-BARRIER COMPOSITION

CROSS REFERENCE TO RELATED APPLICATIONS

This application is a National Stage of International Application No. PCT/JP2019/039790 filed Oct. 9, 2019, claiming priority based on Japanese Patent Application No. 2018-198537 filed Oct. 22, 2018.

TECHNICAL FIELD

The present invention relates to a gas-barrier composition that contains nanocellulose. More specifically, the present invention relates to a gas-barrier composition that contains nanocellulose having an anionic functional group and also a reactive crosslinking agent. The gas-barrier composition can be used for forming a dense crosslinked film.

BACKGROUND ART

It has been proposed to use nanocellulose as an advanced biomass feedstock for various applications such as functional additives and film composite materials. In particular, it is known for instance that materials for a film made of cellulose nanofibers or a laminate containing cellulose nanofibers are capable of preventing or reducing dissolution and/or a diffusion of a gas because the materials have hydrogen bonds between the cellulose fibers and strong crosslinking interactions, thereby exhibiting excellent gas-barrier properties like oxygen barrier properties. For this reason, barrier materials comprising the cellulose nanofibers have been proposed.

In order to fibrillate cellulose fibers, a chemical treatment can be conducted in addition to a mechanical treatment. In the chemical treatment, a hydrophilic functional group such as a carboxyl group or a phosphoric acid group is introduced into a hydroxyl group of cellulose, so that energy required for the fibrillation can be reduced and the barrier properties and dispersibility in an aqueous solvent are improved.

However, when the hydrophilized cellulose nanofibers are used as a coating agent, it may cause degradation in the gas-barrier properties and the film strength of the thus obtained coating film in a high-humidity atmosphere.

In order to solve the problems, for instance, Patent Document 1 below discloses a gas-barrier material containing cellulose fibers having an average fiber diameter of not more than 200 nm and a crosslinking agent having a reactive functional group. The content of the carboxyl group of the cellulose constituting the cellulose fibers is in the range of 0.1 to 2 mmol/g.

Patent Document 2 below describes a gas-barrier product containing fine cellulose fibers having a carboxyl group content of 0.1 to 3 mmol/g and polyvinyl alcohol.

Further, Patent Document 3 below describes a gas-barrier laminate comprising fine cellulose fibers having a carboxyl group content of 0.1 to 3 mmol/g, a layered inorganic compound and a basic material.

PRIOR ART DOCUMENTS

Patent Documents

[Patent Document 1] Japanese Patent 5,064,479 B
[Patent Document 2] JP-A Publication 2012-41489
[Patent Document 3] JP-A Publication 2012-97236

SUMMARY OF THE INVENTION

Problem to be Solved by the Invention

Patent Document 1 provides a crosslinked film formed by using a crosslinking agent in nanocellulose so as to prevent degradation of gas-barrier properties in a humidity atmosphere. In this document, however, since the content of the carboxyl group in the cellulose nanofibers in use is limited to the aforementioned range from the viewpoint of gas-barrier properties, the carboxyl group-containing cellulose nanofibers may be aggregated and gelled under acidic conditions with high crosslinking efficiency, and this may result in degradation in coatability.

Regarding Patent Documents 2 and 3, the obtained products are not crosslinked, and thus, the products are inferior in the gas-barrier properties in comparison with those of crosslinked products.

Accordingly, it is an object of the present invention to provide a gas-barrier composition that can be used for efficiently forming a crosslinked structure in which nanocellulose is homogeneously dispersed, and capable of exhibiting excellent gas-barrier properties even under humidity conditions.

Another object of the present invention is to provide a product having a nanocellulose-containing layer imparted with excellent gas-barrier properties and interlayer adhesiveness.

Means for Solving the Problems

The present invention provides a gas-barrier composition comprising: nanocellulose containing at least one of a sulfuric acid group, a sulfo group, or a phosphoric acid group; and a reactive crosslinking agent.

It is preferable in the gas-barrier composition of the present invention that:

1. the reactive crosslinking agent is contained in an amount of 5 to 30 parts by mass per 100 parts by mass of the nanocellulose (solid content);
2. a layered inorganic compound is contained in an amount of 5 to 30 parts by mass per 100 parts by mass of the nanocellulose (solid content);
3. a hydroxyl group-containing polymer is contained in an amount of 5 to 30 parts by mass per 100 parts by mass of the nanocellulose (solid content);
4. the nanocellulose comprises cellulose nanocrystal and/or cellulose nanofibers;
5. the reactive crosslinking agent is polyvalent carboxylic acid;
6. the polyvalent carboxylic acid is citric acid; and
7. the nanocellulose contains an anionic functional group in an amount of 0.1 to 4.0 mmol/g.

The present invention further provides a gas-barrier product comprising a mixture containing the aforementioned gas-barrier composition and a polyvalent cationic resin.

It is preferable in the gas-barrier product of the present invention that:

1. the polyvalent cationic resin is polyethyleneimine; and
2. a layer of the gas-barrier composition is formed on a layer of the polyvalent cationic resin so that the polyvalent cationic resin and the nanocellulose are mixed with each other.

The present invention further provides a gas-barrier laminate comprising a gas-barrier layer comprising the aforementioned gas-barrier product, and the gas-barrier layer is formed on the substrate.

It is preferable in the gas-barrier laminate of the present invention that a moisture-resistant resin layer is formed on the gas-barrier layer via an adhesive layer comprising an epoxy resin and a polyamine resin.

Effect of the Invention

For the gas-barrier composition of the present invention, nanocellulose that contains at least one of a sulfuric acid group, a sulfo group, or a phosphoric acid group is used. As a result, even when a reactive crosslinking agent like citric acid is used, the nanocellulose can be dispersed stably to form a dense crosslinked film, thereby exhibiting excellent gas-barrier properties. Here, the citric acid is an example of reactive crosslinking agent that imparts an acidic environment and that exhibits excellent crosslinking efficiency.

In addition to that, the composition has excellent coatability since the nanocellulose may not be aggregated and gelled unlike the case where carboxyl group-containing cellulose nanofibers are used.

Further, in a product comprising a mixture containing the gas-barrier composition of the present invention and the polyvalent cationic resin, the hydroxyl group of the nanocellulose and the crosslinking agent form a dense crosslinked film. Furthermore, the nanocellulose fibers keep a dense self-organization structure by a sulfuric acid group, a sulfo group, and a phosphoric acid group, while the polyvalent cationic resin spontaneously diffused is present in the nanocellulose to make a mixture. Therefore, the self-organization structure of the nanocellulose is further strengthened by the polyvalent cation, thereby providing gas-barrier properties superior to those exhibited by the nanocellulose and the crosslinking agent alone.

BRIEF DESCRIPTION OF THE DRAWINGS

The FIGURE is a graph showing results of TOF-SIMS spectrometry for a gas-barrier laminate obtained in Example 6, which has a layer of a mixture containing a polyvalent cationic resin and nanocellulose, where the TOF-SIMS spectrometry is performed by etching from the surface of the coated plane to the interior of the substrate.

MODE FOR CARRYING OUT THE INVENTION (Gas-Barrier Composition)

The gas-barrier composition of the present invention can be characterized particularly in that it comprises nanocellulose containing at least one of a sulfuric acid group, a sulfo group or a phosphoric acid group, and a reactive crosslinking agent.

For the gas-barrier composition of the present invention, nanocellulose containing an anionic functional group, i.e., at least one of a sulfuric acid group, a sulfo group, or a phosphoric acid group is used. As a result, the self-organization structure can be efficiently formed by the charge (anion) possessed by the anionic functional group, and excellent gas-barrier properties can be exhibited.

Even when an acidic reactive crosslinking agent such as polyvalent carboxylic acid is used as the crosslinking agent for crosslinking nanocellulose, the nanocellulose having at least one of the sulfuric acid group, the sulfo group or the phosphoric acid group is stably dispersed, thereby enabling efficiently forming the crosslinked structure in the nanocellulose by the crosslinking agent. As a result, the crosslinked film comprising the gas-barrier composition of the present invention has gas-barrier properties superior to those of a coating film composed only of nanocellulose. The excellent gas-barrier properties are imparted from the synergy with the self-organization structure possessed by the nanocellulose.

In this specification, the term "sulfuric acid group" represents a concept including a sulfate group.

[Nanocellulose]

The nanocellulose used in the gas-barrier composition of the present invention is nanocellulose containing at least one of a sulfuric acid group, a sulfo group, or a phosphoric acid group (hereinafter, this may be simply referred to as "nanocellulose used in the present invention"), and the examples include nanocellulose according to the following (1) to (3), though the present invention is not limited to these examples.

There is no particular limitation for the type of nanocellulose as long as it contains at least one having a fiber length of not more than 500 nm and represented by any of the following (1) to (3). Conventional and well-known cellulose nanofibers may be contained as long as at least one of the sulfuric acid group, the sulfo group or the phosphoric acid group is contained in an amount of not less than 0.1 mmol per gram of the nanocellulose (solid content) and the crystallinity is 605 or more.

(1) Cellulose nanocrystal containing a sulfuric acid group and/or a sulfo group, which is obtained by subjecting a cellulose material to a sulfuric acid treatment.

(2) Cellulose nanocrystal containing sulfuric acid group and/or a sulfo group, which is obtained by subjecting the sulfuric acid group and/or a sulfo group-containing cellulose nanocrystal (1) to a hydrophilization treatment using any of a water-soluble carbodiimide, sulfuric acid, a sulfur trioxide sulfur-pyridine complex, phosphoric acid-urea, a TEMPO catalyst, or an oxidant; or nanocellulose containing a sulfuric acid group and/or a sulfo group, and containing either a phosphoric acid group or a carboxyl group.

(3) Phosphoric acid group-containing nanocellulose or a sulfuric acid group and/or a sulfo group-containing nanocellulose, each obtained by treating a cellulose material with a phosphoric acid group-containing compound or a sulfuric acid group and/or a sulfo group-containing compound, and then, subjecting the cellulose material to a defibration treatment.

(1) Cellulose Nanocrystal

The cellulose nanocrystal is rod-like cellulose crystalline fibers obtained by an acid hydrolysis treatment of cellulose fibers with sulfuric acid or hydrochloric acid. The present invention uses cellulose nanocrystal prepared by a sulfuric acid treatment. The cellulose nanocrystal has a sulfuric acid group and/or a sulfo group capable of contributing to formation of the self-organization structure.

The cellulose nanocrystal prepared by the sulfuric acid treatment usually contains a sulfuric acid group and/or a sulfo group in an amount of 0.01 to 0.2 mmol/g. The cellulose nanocrystal that can be suitably used may have an average fiber diameter of not more than 50 nm, particularly in the range of 2 to 50 nm; an average fiber length in the range of 100 to 500 nm; an aspect ratio in the range of 5 to 50; and a crystallinity of not less than 60%, particularly not less than 70%.

(2) Nanocellulose Formed by Hydrophilization of Cellulose Nanocrystal

As mentioned above, since the cellulose nanocrystal inherently has a sulfuric acid group and/or a sulfo group, it can be used directly. However, since the content of the sulfuric acid group and/or the sulfo group in the cellulose nanocrystal is small, the amount of the sulfuric acid group and/or the sulfo group in the cellulose nanocrystal is adjusted by a treatment using any of water-soluble carbodiimide, sulfuric acid, or sulfur trioxide-pyridine complex, and the nanocellulose may be further fibrillated. In addition, as a result of a treatment using any of a phosphoric acid-urea, a TEMPO catalyst or an oxidant, an anionic functional group such as a phosphoric acid group or a carboxyl group is introduced together with the sulfuric acid group and/or the sulfo group.

Any one of the treatments may be conducted for hydrophilization as long as the total content of the sulfuric acid group, the sulfo group and the phosphoric acid group is within the range. Alternatively, one of the treatments can be conducted plural times alone or in combination with any other treatment.

<Hydrophilization Treatment Using Carbodiimide>

In the treatment using carbodiimide, cellulose nanocrystal and carbodiimide are stirred in a solvent such as dimethylformamide, and sulfuric acid is added thereto for a reaction at a temperature in a range of 0 to 80° C. for 5 to 300 minutes, thereby obtaining a sulfuric ester. The carbodiimide and the sulfuric acid are preferably used in amounts of 5 to 30 mmol per gram of the cellulose nanocrystal (solid content).

Subsequently, an alkaline compound such as sodium hydroxide is added thereto to convert the sulfuric acid group and/or the sulfo group that has been introduced into the cellulose nanocrystal from H-form to Na-form preferably for improving the yield. Later, filtration with a dialysis membrane or the like is conducted to remove impurities and the like, thereby preparing sulfuric acid group and/or sulfo group-containing cellulose nanocrystal. The sulfuric acid group and/or sulfo group-containing cellulose nanocrystal contains the sulfuric acid group and/or the sulfo group in an amount of 0.3 to 1.3 mmol/g.

An example of the carbodiamide that can be used here is a 1-ethyl-3-(3-dimethylaminopropyl)carbodiimide, which is a water-soluble compound having a carbodiimide group (—N=C=N—) in its molecules. It is also possible to use dicyclohexylcarbodiimide or the like, which is dissolvable in an organic solvent.

<Hydrophilization Treatment Using Sulfuric Acid>

The cellulose nanocrystal used in the present invention is prepared by subjecting cellulose fibers to a hydrolysis treatment using sulfuric acid. This cellulose nanocrystal is further subjected to a hydrophilization treatment using sulfuric acid. The sulfuric acid is preferably used in an amount of 40 to 70% by mass per gram of the cellulose nanocrystal (solid content). As a result of reaction at a temperature of 40 to 60° C. for 5 to 300 minutes and the following filtration treatment using a dialysis membrane to remove impurities and the like, a sulfuric acid group and/or sulfo group-modified cellulose nanocrystal is prepared.

<Hydrophilization Treatment Using Sulfur Trioxide-Pyridine Complex>

In the treatment using the sulfur trioxide-pyridine complex, the cellulose nanocrystal is allowed to react with the sulfur trioxide-pyridine complex in dimethyl sulfoxide for 5 to 240 minutes at a temperature in a range of 0 to 60° C. so as to introduce the sulfuric acid group and/or the sulfo group into the hydroxyl group at the 6-position of the cellulose glucose unit, thereby preparing sulfuric acid group and/or sulfo group-containing cellulose nanocrystal. The sulfuric acid group and/or sulfo group-containing cellulose nanocrystal prepared by the treatment contains a sulfuric acid group and/or a sulfo group in an amount of 0.3 to 1.3 mmol/g.

The sulfur trioxide-pyridine complex is preferably formulated in mass from 0.5 to 4 g per gram of the cellulose nanocrystal (solid content).

After completion of the reaction, preferably an alkaline compound such as sodium hydroxide is added to convert the sulfuric acid group and/or the sulfo group that has been introduced into the cellulose nanocrystal from H-form to Na-form in order to improve the yield. Thereafter, dimethylformamide or isopropyl alcohol is added. After washing by centrifugation or the like, impurities and the like are removed by a filtration treatment using a dialysis membrane or the like, whereby a sulfuric acid group and/or a sulfo group-modified cellulose nanocrystal is prepared.

<Hydrophilization Treatment Using Phosphoric Acid-Urea>

The hydrophilization treatment using phosphoric acid-urea can be conducted in the same manner as in the conventionally-known treatment of introducing a phosphoric acid group by use of phosphoric acid-urea. Specifically, cellulose nanocrystal is made react with a phosphoric acid group-containing compound in the presence of a urea-containing compound for 5 to 120 minutes at a temperature in a range of 135 to 180° C., whereby a phosphoric acid group is introduced into the hydroxyl group of the cellulose glucose unit, and a cellulose nanocrystal containing a sulfuric acid group and/or a sulfo group and a phosphoric acid group is prepared. The cellulose nanocrystal subjected to this treatment, which contains the sulfuric acid group and/or the sulfo group together with the phosphoric acid group, contains the sulfuric acid group and/or the sulfo group and the phosphoric acid group in a total amount of 0.01 to 4.0 mmol.

Examples of the phosphoric acid group-containing compound include phosphoric acid, a lithium salt of phosphoric acid, a sodium salt of phosphoric acid, a potassium salt of phosphoric acid, and an ammonium salt of phosphoric acid. Among them, sodium dihydrogen phosphate, ammonium dihydrogen phosphate, phosphoric acid or the like can be suitably used. The phosphoric acid group-containing compound is preferably added in an amount of 10 to 100 mmol per 10 g of the cellulose nanocrystal (solid content).

Examples of the urea-containing compound include urea, thiourea, burette, phenylurea, benzyl urea, and dimethyl urea. Among them, urea can be suitably used. The urea-containing compound is preferably used in an amount of 150 to 200 mmol per 10 g of the cellulose nanocrystal (solid content).

<Hydrophilization Treatment Using TEMPO Catalyst>

The treatment for hydrophilizing cellulose nanocrystal having a sulfuric acid group and/or a sulfo group by use of a TEMPO catalyst (2,2,6,6-tetramethylpiperidine-1-oxyl) can be conducted in the same manner as in any of conventionally-known oxidation methods using a TEMPO catalyst. Specifically, in the hydrophilization reaction of the cellulose nanocrystal having a sulfuric acid group and/or a sulfo group, a hydroxyl group at 6-position of a cellulose glucose unit is oxidized to a carboxyl group via a TEMPO catalyst (2,2,6,6-tetramethylpiperidine 1-oxyl) under conditions of an aqueous system, an ordinary temperature, and an ordinary pressure. The sulfuric acid group and/or sulfo group-containing cellulose nanocrystal prepared by this treatment contains a sulfuric acid group and/or a sulfo group together with a carboxyl group in a total amount of 0.01-4.0 mmol.

The 2,2,6,6-tetramethylpiperidine-1-oxyl used as the TEMPO catalyst can be replaced by a derivative of TEMPO, such as 4-acetamido-TEMPO, 4-carboxy-TEMPO, or 4-phosphonoxy-TEMPO.

The use amount of TEMPO catalyst is set to a range of 0.01 to 100 mmol, preferably 0.01 to 5 mmol per gram of the cellulose nanocrystal (solid content).

In the hydrophilization-oxidation treatment, the TEMPO catalyst may be used alone or together with an oxidant or a co-oxidant such as a bromide or an iodide. The oxidant or the co-oxidant can be added by a conventionally-known formulation.

(3) Phosphoric Acid Group-Containing Nanocellulose Treated with Phosphoric Acid Group-Containing Compound Alternatively, a cellulose-based material is treated with a phosphoric acid group-containing compound so as to introduce a phosphoric acid group into the hydroxyl group at the 6-position of the cellulose glucose unit, and then, defibrillation treatment is conducted to obtain a phosphoric acid group-containing nanocellulose that can be used in the present invention. The phosphoric acid group-containing nanocellulose prepared by this treatment contains the phosphoric acid group in an amount of 0.01 to 4.0 mmol/g.

The treatment using the phosphoric acid group-containing compound can be conducted in the same manner as in the treatment using the phosphoric acid-urea. The subsequent defibration treatment can be conducted by any of conventionally-known methods, specifically for instance, using an ultrahigh-pressure homogenizer, an ultrasound homogenizer, a grinder, a high-speed blender, a bead mill, a ball mill, a jet mill, a disassembler, a beater or a biaxial extruder. The defibration treatment can be conducted in either dry or wet process. Since the subsequent crosslinking treatment is preferably conducted with respect to slurry, suitably the defibration treatment is conducted with an ultrahigh-pressure homogenizer or the like using water or the like as a dispersion medium.

Cellulose-based materials that have been used as materials of cellulose nanofibers can be employed here. The examples include kraft pulp, wood pulp, non-wood pulp, cotton, and bacterial cellulose, or paper chips, though the present invention is not limited thereto. Among them, kraft pulp is preferred. The wood pulp may be either bleached or unbleached.

[Reactive Crosslinking Agent]

Any reactive crosslinking agent can be used in the gas-barrier composition of the present invention without any particular limitation as long as the crosslinking agent is capable of forming a crosslinked structure in the nanocellulose. However, since the nanocellulose used in the present invention can be dispersed stably without aggregation even under acidic conditions, a polyvalent carboxylic acid or an anhydride thereof is used particularly desirably as the reactive crosslinking agent, because of its favorable reaction efficiency.

Examples of the polyvalent carboxylic acid include: alkyl dicarboxylic acids such as citric acid, oxalic acid, and malonic acid; aromatic dicarboxylic acids such as terephthalic acid and maleic acid; or anhydrides thereof. In particular, anhydrous citric acid can be suitably used.

The blend amount of the reactive crosslinking agent may vary depending on the type thereof. In a case of using the anhydrous citric acid, it is preferably blended in a range of 5 to 30 parts by mass per 100 parts by mass of nanocellulose (solid content).

[Acid Catalyst]

It is preferable that the gas-barrier composition of the present invention contains an acid catalyst together with the crosslinking agent. Examples of the acid catalyst include sulfuric acid, acetic acid, and hydrochloric acid. Among them, sulfuric acid can be used particularly suitably. The acid catalyst is preferably blended in a range of 0.5 to 5 parts by mass per 100 parts by mass of nanocellulose (solid content).

[Others]

The gas-barrier composition of the present invention contains nanocellulose containing at least one of the sulfuric acid group, the sulfo group, or the phosphoric acid group (nanocellulose to be used in the present invention) together with the reactive crosslinking agent. It is suitable that the gas-barrier composition further contains a hydroxyl group-containing polymer and/or a layered inorganic compound.

In other words, since the hydroxyl group-containing polymer to be used with the nanocellulose of the present invention serves to form a dense crosslinked structure together, the gas-barrier properties of the crosslinked film is remarkably improved, and the excellent gas-barrier properties can be maintained even under humidity conditions.

The layered inorganic compound has swellability and cleavability. Therefore, the nanocellulose to be used in the present invention enters the layered inorganic compound to widen the gap between the layers and make composites. As a result, the effect of bypassing the permeated gas (the effect can be obtained by the layered inorganic compound) and the crosslinked structure of the nanocellulose to be used in the present invention function in combination to exhibit excellent gas-barrier properties, and the excellent gas-barrier properties can be exhibited even under humidity conditions.

Examples of the hydroxyl group-containing polymer include polyvinyl alcohol, vinyl acetate alcohol copolymer, ethylene vinyl alcohol copolymer, polyacrylic acid, polymethacrylic acid, carboxyl methylcellulose, and starch. Among them, polyvinyl alcohol can be suitably used. The polyvinyl alcohol preferably is a completely-saponified type having a polymerization degree in a range of 100 to 10000.

The amount of the hydroxyl group-containing polymer to be blended is preferably 5 to 30 parts by mass per 100 parts by mass of the nanocellulose (solid content).

The layered inorganic compound can be selected from natural or synthetic ones. Specifically, any conventionally-known layered inorganic compound can be used as long as it exhibits hydrophilicity or hydrophobicity, and further it swells with a solvent and exhibits cleavability. The examples include kaolinite, dickite, nacrite, halloysite, antigorite, chrysotile, pyrophyllite, montmorillonite, hectorite, mica, tetrasilica mica, sodium teniolite, white mica, margarite, talc, vermiculite, gold mica, zansophilite, and chlorite, though the present invention is not limited to these examples. Among them, synthetic mica (hydrophilic and swellable) can be suitably used.

The blend amount of the layered inorganic compound is preferably 5 to 30 parts by mass per 100 parts by mass of the nanocellulose (solid content).

[Preparation of Gas-Barrier Composition]

The gas-barrier composition of the present invention contains nanocellulose (nanocellulose to be used in the present invention) containing at least one of a sulfuric acid group, a sulfo group, or a phosphoric acid group, and a reactive crosslinking agent. It may further contain an acid catalyst, a hydroxyl group-containing polymer and/or a layered inorganic compound as required.

The gas-barrier composition may be prepared by providing the nanocellulose to be used in the present invention as a dispersion liquid with an adjusted solid concentration. To the dispersion liquid, the reactive crosslinking agent may be added directly for preparation. Alternatively, the reactive crosslinking agent may be provided as an aqueous solution to be mixed with the dispersion liquid of the nanocellulose to be used in the present invention.

In the dispersion liquid of the gas-barrier composition, the solid content of the nanocellulose to be used in the present invention is preferably in the range of 0.1 to 10% by mass.

The dispersion liquid of the gas-barrier composition includes polyvalent carboxylic acid like citric acid added as a reactive crosslinking agent. The dispersion liquid has pH of not more than 6, in particular, in a range of 2 to 4, though it depends on the content of the polyvalent carboxylic acid. As described above, since the nanocellulose of the present invention contains at least one of a sulfuric acid group, a sulfo group, or a phosphoric acid group, it is stably dispersed without aggregation even under acidic conditions.

The gas-barrier composition of the present invention can form a crosslinked coating film by itself. The gas-barrier composition also can form a dense crosslinked coating film excellent in gas-barrier properties by drying at 5 to 200° C. for 0.5 to 180 minutes, particularly at 150 to 180° C. for 0.5 to 60 minutes, though it depends on the coating amount.

(Gas-Barrier Product)

A gas-barrier product of the present invention is a product composed of the aforementioned gas-barrier composition or a mixture containing the gas-barrier composition and a polyvalent cationic resin. When the product contains 1.0 g/m² of the nanocellulose (solid content), the oxygen permeability at 23° C. 50% RH is less than 18.5 (cc/m²·day·atm). The product can exhibit oxygen-barrier properties superior to those of nanocellulose that does not contain a sulfuric acid group, a sulfo group or a phosphoric acid group and/or a simple gas-barrier composition that does not contain a reactive crosslinking agent, or a gas-barrier product of a mixture containing the gas-barrier composition and a polyvalent cationic resin. Furthermore, in a case of forming the product on a substrate, adhesiveness with respect to the substrate layer can be remarkably improved.

The product of the present invention is prepared by forming a layer containing the gas-barrier composition on a layer of the polyvalent cationic resin, so that it can be formed as a product of a mixture in a state capable of exhibiting the gas-barrier properties and the adhesiveness with respect to the substrate. In other words, this mixture is obtained by mixing the polyvalent cationic resin and the gas-barrier composition while maintaining the self-organization structure of the nanocellulose in the gas-barrier composition and by forming the crosslinked structure in this state, although it may be difficult to quantitatively express the mixed state in the product of the present invention. The gas-barrier product comprises a mixture of the gas-barrier composition and the polyvalent cationic resin, and in the interior of the mixture, the nanocellulose, the polyvalent cationic resin and the hydroxyl group-containing polymer are present from the area in the vicinity of the surface of the outermost portion to the area in the vicinity of the substrate comprising a thermoplastic resin. The ratios of the nanocellulose and the polyvalent cationic resin are higher in the vicinity of the interface between the substrate and the mixture layer than the counterparts in the other sites.

[Polyvalent Cationic Resin]

The polyvalent cationic resin used in the product of the present invention is a resin containing a water-soluble or water-dispersible polyvalent cationic functional group. Examples of the polyvalent cationic resin include: water-soluble amine polymers such as polyethyleneimine, polyallylamine, polyamine polyamide-epichlorohydrin, and polyamine epichlorohydrin; polyacrylamide; poly(diallyldimethylammonium salt); dicyandiamide formalin; poly (meth)acrylate; cationized starch; cationized gum; chitin; chitosan; and gelatin. Among them, the water-soluble amine polymer, particularly polyethyleneimine can be suitably used.

(Method for Producing Product)

The product of the present invention can be produced by: coating and drying a polyvalent cationic resin-containing solution so as to form a layer of the polyvalent cationic resin; and coating and drying a gas-barrier composition-containing dispersion liquid on the layer of the polyvalent cationic resin. The thus produced product comprises a mixture containing the polyvalent cationic resin and the nanocellulose which are mixed with each other in a unique manner and have a crosslinked structure.

Alternatively, the polyvalent cationic resin-containing solution may be coated on a substrate of a thermoplastic resin so that a laminate comprising a product of the gas-barrier composition and the polyvalent cationic resin can be formed on the substrate. In another method, the polyvalent cationic resin-containing solution and the gas-barrier composition-containing dispersion liquid are coated and dried in this order to form a cast film, which can be used as a gas-barrier film.

[Coating and Drying Polyvalent Cationic Resin-Containing Solution]

The polyvalent cationic resin containing-solution preferably contains the resin in an amount of 0.01 to 30% by mass, particularly 0.1 to 10% by mass, in terms of the solid content. When the amount of the polyvalent cationic resin is smaller than the range, unlike the case where the polyvalent cationic resin is within the range, the gas-barrier properties and the interfacial peeling strength cannot be improved. Even when the amount of the polyvalent cationic resin is larger than the range, the gas-barrier properties and the interfacial peeling strength cannot be further improved. Further, not only the economic performance but the coatability and the film formability may deteriorate.

Examples of the solvent to be used in the polyvalent cationic resin-containing solution include: water; alcohols such as methanol, ethanol, and isopropanol; ketones such as 2-butanone and acetone; aromatic solvents such as toluene; and a mixed solvent of water and any of these components.

The coating amount of the polyvalent cationic resin-containing solution is determined according to the concentration of the solution containing the polyvalent cationic resin in terms of the amount of nanocellulose (solid content) in the layer formed from the gas-barrier composition-containing dispersion liquid. That is, when 1.0 g/m² of the nanocellulose (solid content) is contained as described above, the solution is preferably coated so that 0.01 to 2.0 g/m² of the polyvalent cationic resin is contained. When the amount of the polyvalent cationic resin is smaller than the range, it may be impossible to improve the interfacial peeling strength to the hydrophobic substrate material such as a polyester resin, unlike the case where the amount is within the range. When the amount of the polyvalent cationic resin is larger than the range, the gas-barrier properties of the product may not be improved unlike the case where the amount is within the range.

Examples of coating methods include spray coating, immersion, or coating with a bar coater, a roll coater, a gravure coater or the like, though the present invention is not limited to these examples. The coated film is preferably dried under conditions at a temperature of 5 to 200° C. and for 0.1 second to 24 hours. The drying treatment can be conducted by oven drying, infrared heating, high-frequency heating or the like. Alternatively, natural drying can be employed.

[Coating and Drying of Gas-Barrier Composition-Containing Dispersion Liquid]

The gas-barrier composition-containing dispersion liquid preferably contains nanocellulose in an amount of 0.01 to 10% by mass, particularly 0.5 to 5.0% by mass, in terms of the solid content. When the amount is smaller than the above range, the gas-barrier properties become inferior as compared with a case where the amount is within the above range. On the other hand, when the amount is larger than the range, the coatability and the film formability may be inferior as compared with a case where the amount is within the range.

For the dispersion liquid, water can be used alone. Alternatively, the dispersion liquid may be a mixed solvent of water and alcohol such as methanol, ethanol or isopropanol, ketone such as 2-butanone and acetone, or an aromatic solvent such as toluene.

Any well-known additives can be blended in the solution containing the polyvalent cationic resin-containing solution or the gas-barrier composition-containing dispersion liquid as required, and examples of the additive include filler, a colorant, an ultraviolet absorber, an antistatic agent, a waterproofing agent, a metal salt, colloidal silica, an alumina sol, titanium oxide, and fine particles.

It is preferable that the gas-barrier composition-containing dispersion liquid is coated so that the content of the nanocellulose (solid content) will be 0.1 to 3.0 g/m$^2$.

The coating and drying of the gas-barrier composition-containing dispersion liquid can be conducted in a manner similar to the method of coating and drying the polyvalent cationic resin-containing solution. It is preferable to dry under conditions of a temperature in a range of 5 to 200° C. for 0.1 second to 24 hours, and in particular, a temperature in a range of 150 to 180° C. for 0.5 to 60 minutes, so that it is possible to form a dense crosslinked structure.

(Laminate)

A laminate comprising the product of the present invention is formed by arranging a barrier layer of the product of the present invention on a layer of a thermoplastic resin. Since the polyvalent cationic resin serves to improve the interfacial peel strength with respect to the layer of a hydrophobic resin, the interfacial peel strength of the barrier layer and the layer of the thermoplastic resin is 2.3 (N/15 mm) or more, whereby delamination between the barrier layer and the substrate can be effectively prevented.

As described above, the laminate can be produced by coating and drying the above-described polyvalent cationic resin-containing solution on a layer (substrate) made of a thermoplastic resin so as to form a polyvalent cationic resin-containing layer, and then, coating and drying the gas-barrier composition-containing dispersion liquid on the polyvalent cationic resin-containing layer, whereby a barrier layer formed of a product of a mixture in which the polyvalent cationic resin and the gas-barrier composition are mixed is formed on the layer (substrate) made of the thermoplastic resin.

A thermoplastic resin can be used for the substrate. This substrate is subjected to extrusion, injection, blowing, stretch-blowing or pressing to be formed into a film or a sheet, or a product shaped as a bottle, a cup, a tray or a pouch.

Though the thickness of the substrate may vary depending on the shape, use or the like of the laminate and it cannot be determined unconditionally, it is preferably in the range of 5 to 50 μm for a film.

Examples of the thermoplastic resin include: olefin-based copolymers such as low-, medium- or high-density polyethylene, linear low-density polyethylene, polypropylene, ethylene-propylene copolymer, ethylene-butene-copolymer, ionomer, ethylene-vinyl acetate copolymer, and ethylene-vinyl alcohol copolymer; aromatic polyesters such as polyethylene terephthalate, polybutylene terephthalate, polyethylene terephthalate/isophthalate, and polyethylene naphthalate; aliphatic polyesters such as polylactic acid, polycaprolactone, and polybutylene succinate; polyamides such as nylon 6, nylon 6,6, nylon 6,10, and metaxylylene adipamide; styrene-based copolymers such as polystyrene, styrene-butadiene block copolymer, styrene-acrylonitrile copolymer, and styrene-butadiene-acrylonitrile copolymer (ABS resin); vinyl chloride-based copolymers such as polyvinyl chloride, and vinyl chloride-vinyl acetate copolymer; acrylic copolymers such as polymethyl methacrylate, and methyl methacrylate.ethyl acrylate copolymer; polycarbonate, cellulose-based resins; and regenerated cellulose such as acetyl cellulose, cellulose acetyl propionate, cellulose acetate butyrate, and cellophane. Among them, polyethylene terephthalate can be suitably used.

The thermoplastic resin may be blended with one or plural kinds of additives such as a pigment, an antioxidant, an antistatic agent, an ultraviolet absorber, or a lubricant, if desired.

In the laminate including the product of the present invention, other layers may be formed if necessary in addition to the barrier layer formed of the above-described substrate and the product.

Since the gas-barrier properties of the barrier layer comprising the product of the present invention may deteriorate under high-humidity conditions, it is preferable to further form a layer of a conventionally-known moisture-resistant resin such as an olefin resin or a polyester resin. This layer may be arranged via a moisture-resistant adhesive layer comprising a curing reaction product of an epoxy resin and a polyamine resin, or an adhesive layer comprising a conventionally-known polyurethane-based adhesive or the like.

EXAMPLES

Examples of the present invention will be described below. It should be noted that these Examples are simply a part of the present invention, and the present invention is not limited to these Examples. Methods for the measurement for the respective items are described below.

<Content of Anionic Functional Group>

A nanocellulose-containing dispersion liquid was weighed, to which ion-exchanged water was added to prepare 100 ml of 0.05 to 0.3 mass % nanocellulose-containing dispersion liquid. Further, 0.1 g of cation-exchanged resin was added thereto and stirred. Later, filtration was conducted to separate the cation-exchanged resin from the nanocellulose-containing dispersion liquid. A 0.05 M sodium hydroxide solution was added dropwise to the cation-exchanged dispersion liquid using an automatic potentiometric titrator (manufactured by Kyoto Electronics Manufacturing Co., Ltd.) to measure the change in electrical conductivity exhibited by the nanocellulose-containing dispersion liquid. The amount of the titrated sodium hydroxide consumed for neutralization of the anionic functional group was determined from the obtained conductivity curve, from which the content of the anionic functional group (mmol/g) was calculated using the following formula.

Anionic functional group content (mmol/g)=Amount of titrated sodium hydroxide (ml) consumed for neutralization of anionic functional groups×Concentration of sodium hydroxide (mmol/ml)÷Solid mass of nanocellulose (g)
<Oxygen Permeability>

The oxygen permeability of the product (cc/m$^2$ day·atm) was measured at 23° C. and a humidity of 50% RH using an oxygen permeation analyzer (OX-TRAN2/22, MOCON).
<TOF-SIMS>

A gas-barrier laminate having a layer of a mixture containing a polyvalent cationic resin and nanocellulose was cut into 1 cm×1 cm squares and fixed to a specimen stage, with its coating surface facing upward. Using a TOF-SIMS spectrometer (TRIFT V manufactured by ULVAC-PHI Inc.), the product was analyzed from the surface of the coating to the interior of the substrate while being etched. The product was irradiated with primary ions ($Bi_3^{2+}$), using Ar-gas cluster ions ($Ar_n^+$) as etching ions. The primary ion acceleration voltage was 30 KV, the measurement polarity was set to negative ions, and a neutralization gun for charge correction was used. The results are shown in the FIGURE.

Example 1

<Preparation of Gas-Barrier Composition-Containing Dispersion Liquid>

Cellulose nanocrystal was prepared by decomposing pulp with 64 mass % sulfuric acid, and 1 g of the cellulose nanocrystal (solid content) was dispersed in 5 ml of N,N-dimethylformamide to prepare a cellulose nanocrystal dispersion liquid. 10 mmol of 1-ethyl-3-(3-diethylaminopropyl)carbodiimide hydrochloride (manufactured by Tokyo Chemical Industry Co., Ltd.) was dissolved in another 5 ml of N,N-dimethylformamide to make a solution, and the solution was added to the cellulose nanocrystal dispersion liquid to be dispersed for 5 minutes. 10 mmol of sulfuric acid was dispersed in another 5 ml of N,N-dimethylformamide to prepare a dispersion liquid, and the liquid was introduced slowly into the cellulose nanocrystal dispersion liquid, and the cellulose nanocrystal was subjected to a hydrophilization treatment while being stirred at 0° C. for 60 minutes. And then, after adding ion-exchanged water and sodium hydroxide solution, the liquid was introduced into the interior of a dialysis membrane (manufactured by Spectrum Laboratories P.L.C., fractionated molecular weight of 3500 to 5000 D) and allowed to stand in ion-exchanged water to remove impurities and the like. Subsequently, 10 parts by mass of anhydrous citric acid and 2 parts by mass of sulfuric acid were added to 100 parts by mass of the nanocellulose (solid content) and stirred, thereby preparing a nanocellulose-containing dispersion liquid containing a sulfuric acid group and/or a sulfo group (gas-barrier composition-containing dispersion liquid). The pH was 3, and the anionic functional group content was 0.7 mmol/g.
<Production of Gas-Barrier Product>

A gas-barrier composition-containing dispersion liquid containing 3% by mass of nanocellulose (solid content) was produced in the aforementioned manner. This liquid was coated on a corona-treated substrate of a biaxially-stretched PET film (Lumirror P60, 12 μm, manufactured by Toray Industries, Inc.), which was air-dried overnight at room temperature. This was later dried at 150° C. for 30 minutes to produce a gas-barrier product containing the gas-barrier resin composition. The coating amount as a solid content of the nanocellulose was 1.0 g/m$^2$.

Example 2

<Preparation of Gas-Barrier Product Comprising Gas-Barrier Composition and Polyvalent Cationic Resin-Containing Mixture>

A corona-treated substrate of a biaxially-stretched PET film (Lumirror P60, 12 μm, manufactured by Toray Industries, Inc.) was used in this Example. On this substrate, polyethyleneimine (PEI) (EPOMIN P-1000, manufactured by Nippon Shokubai Co., Ltd.) was coated with a bar coater so that the coating amount as a solid content would be 0.6 g/m$^2$. It was dried to be solidified at 50° C. for 10 minutes by a hot air dryer (MSO-TP, manufactured by ADVANTEC CO., LTD.). A gas-barrier composition-containing dispersion liquid containing 3, by mass of nanocellulose (solid content) was prepared in the same manner as in Example 1, and the liquid was coated on the aforementioned solidified polyethyleneimine by use of a bar coater, and then, dried at 150° C. for 30 minutes, thereby producing a gas-barrier product comprising a mixture of the gas-barrier composition and the polyvalent cationic resin. The coating amount of the nanocellulose was 1.0 g/m$^2$ as a solid content.

Example 3

Treatments for hydrophilization and purification of the cellulose nanocrystal were carried out in the same manner as in Example 1. To 100 parts by mass of this nanocellulose (solid content), 10 mass parts of anhydrous citric acid, 2 parts by mass of sulfuric acid, 10 parts by mass of synthetic mica (hydrophilic swellable mica, manufactured by Katakura & Co-op Agri Corporation) and 10 parts by mass of polyvinyl alcohol (completely-saponified type, manufactured by Kuraray Co., Ltd.) were added and stirred to prepare a gas-barrier composition-containing dispersion liquid having a pH of 3. Using the gas-barrier composition-containing dispersion liquid, a gas-barrier product containing the gas-barrier composition was prepared in the same manner as in Example 1. The coating amount of nanocellulose was 1.0 g/m$^2$ as a solid content.

Example 4

A corona-treated substrate of a biaxially-stretched PET film (Lumirror P60, 12 μm, manufactured by Toray Industries, Inc.) was used in this Example. On this substrate, polyethyleneimine (PEI) (EPOMIN P-1000, manufactured by Nippon Shokubai Co., Ltd.) was coated with a bar coater so that the coating amount as a solid content would be 0.6 g/m$^2$. It was dried to be solidified at 50° C. for 10 minutes by a hot air dryer (MSO-TP, manufactured by ADVANTEC CO., LTD.). A gas-barrier composition-containing dispersion liquid containing 3% by mass of nanocellulose (solid content) was prepared in the same manner as in Example 3, and the liquid was coated on the aforementioned solidified polyethyleneimine with a bar coater, and then, dried at 150° C. for 30 minutes, whereby a gas-barrier product comprising a mixture of the gas-barrier composition and the polyvalent cationic resin was produced. The coating amount as a solid content of the nanocellulose was 1.0 g/m$^2$.

Example 5

Cellulose nanocrystal was prepared by decomposing pulp with 64 mass % sulfuric acid, and 1 g of the cellulose nanocrystal (solid content) was incorporated into ion-exchanged water so as to conduct a dispersion treatment. Next, 10 parts by mass of anhydrous citric acid and 2 parts by mass of sulfuric acid were added to 100 parts by mass of nanocellulose (solid content) and stirred to prepare a gas-barrier composition-containing dispersion liquid containing 1% by mass of nanocellulose (solid content) containing a sulfuric acid group and/or a sulfo group. The pH was 3, and the anionic functional group content of the nanocellulose was 0.1 mmol/g. Using the gas-barrier composition-containing dispersion liquid, a gas-barrier product comprising a mixture containing the gas-barrier composition and the polyvalent cationic resin was produced in the same manner as in Example 2. The coating amount as a solid content of nanocellulose was 1.0 g/m$^2$.

Example 6

Cellulose nanocrystal was prepared by decomposing pulp with 64 mass % sulfuric acid, and 1 g of the cellulose nanocrystal (solid content) was incorporated into ion-exchanged water so as to conduct a dispersion treatment. Next, 10 parts by mass of anhydrous citric acid, 2 parts by mass of sulfuric acid, 10 parts by mass of synthetic mica (hydrophilic swellable mica, manufactured by Katakura & Co-op Agri Corporation) and 10 parts by mass of polyvinyl alcohol (completely-saponified type, manufactured by Kuraray Co., Ltd.) were added to 100 parts by mass of nanocellulose (solid content) and stirred to prepare a gas-barrier composition-containing dispersion liquid containing 1% by mass of nanocellulose (solid content) containing a sulfuric acid group and/or a sulfo group. The pH was 3, and the anionic functional group content of the nanocellulose was 0.1 mmol/g. Using the gas-barrier composition-containing dispersion liquid, a gas-barrier product comprising a mixture containing the gas-barrier composition and the polyvalent cationic resin was produced in the same manner as in Example 5. The coating amount as a solid content of nanocellulose was 1.0 g/m$^2$.

Example 7

A phosphoric acid solution was prepared by dissolving 10 g of urea, 6 g of disodium dihydrogen phosphate dihydrate and 4 g of disodium hydrogen phosphate in 10 g of ion-exchanged water. To this phosphoric acid solution, 10 g of cellulose nanocrystal (solid content) prepared by decomposing pulp with 64 masse sulfuric acid was added and stirred. This was heated for evaporation at 165° C. for 30 minutes using a multiple safety dryer (manufactured by Futaba Science Co., Ltd.), and the cellulose nanocrystal was subjected to a hydrophilization treatment. Thereafter, 100 ml of ion-exchanged water was added and a dispersion treatment was conducted, and then, washing was conducted using an ultracentrifuge (50000 rpm, 10 minutes). Further, ion-exchanged water and a sodium hydroxide solution were added to adjust pH to 12, and washing was conducted using the ultracentrifuge (50000 rpm, 10 minutes) while adding ion-exchanged water until the pH reached 8. Thereafter, it was placed in the interior of a dialysis membrane (manufactured by Spectrum Laboratories P.L.C., fractionated molecular weight: 3500 to 5000 D) and allowed to stand in ion-exchanged water to remove impurities and the like. Next, 10 parts by mass of anhydrous citric acid, 2 parts by mass of sulfuric acid, 10 parts by mass of synthetic mica (hydrophilic swellable mica, manufactured by Katakura & Co-op Agri Corporation) and 10 parts by mass of polyvinyl alcohol (completely-saponified type, manufactured by Kuraray Co., Ltd.) were added to 100 parts by mass of nanocellulose (solid content) and stirred to prepare a gas-barrier composition-containing dispersion liquid containing 1% by mass of nanocellulose (solid content) containing a sulfuric acid group and/or a sulfo group together with a phosphoric acid group. The pH was 3, and the anionic functional group content of the nanocellulose was 0.3 mmol/g. Using the gas-barrier composition-containing dispersion liquid, a gas-barrier product comprising a mixture containing the gas-barrier composition and the polyvalent cationic resin was produced in the same manner as in Example 4. The coating amount as a solid content of nanocellulose was 1.0 g/m$^2$.

Example 8

An aqueous dispersion liquid of 10 g of cellulose nanocrystal (solid content) was prepared by decomposing pulp with 64 mass % sulfuric acid. To this dispersion liquid, 0.8 mmol of TEMPO catalyst (manufactured by Sigma Aldrich Co., LLC) and 12.1 mmol of sodium bromide were added, to which ion-exchanged water was further added for filling a 1 L volumetric flask, and the liquid was stirred to be homogeneously dispersed. Later, 15 mmol of sodium hypochlorite was added to initiate an oxidation reaction. During the reaction, the pH in the system was kept in a range of 10.0 to 10.5 with 0.5 N sodium hydroxide aqueous solution, and a hydrophilization treatment was conducted while stirring at 30° C. for 4 hours. The thus hydrophilized cellulose nanocrystal was washed using an ultracentrifuge (50000 rpm, 10 minutes) while adding ion-exchanged water until the pH reached 8. Thereafter, it was placed in the interior of a dialysis membrane (manufactured by Spectrum Laboratories P.L.C., fractionated molecular weight: 3500 to 5000 D) and allowed to stand in ion-exchanged water to remove impurities and the like. Next, 10 parts by mass of anhydrous citric acid and 2 parts by mass of sulfuric acid were added to 100 parts by mass of nanocellulose (solid content) and stirred to prepare a gas-barrier composition-containing dispersion liquid containing 1% by mass of nanocellulose (solid content) containing a sulfuric acid group and/or a sulfo group together with a carboxyl group. The pH was 3, and the anionic functional group content of the nanocellulose was 1.3 mmol/g. Using the gas-barrier composition-containing dispersion liquid, a gas-barrier product comprising a mixture containing the gas-barrier composition and the polyvalent cationic resin was produced in the same manner as in Example 2. The coating amount as a solid content of nanocellulose was 1.0 g/m$^2$.

Example 9

The cellulose nanocrystal was subjected to hydrophilization and purification treatments in the same manner as in Example 8. Next, 10 parts by mass of anhydrous citric acid, 2 parts by mass of sulfuric acid, 10 parts by mass of synthetic mica (hydrophilic swellable mica, manufactured by Katakura & Co-op Agri Corporation) and 10 parts by mass of polyvinyl alcohol (completely-saponified type, manufactured by Kuraray Co., Ltd.) were added to 100 parts by mass of nanocellulose (solid content) and stirred to prepare a gas-barrier composition-containing dispersion liquid containing 1% by mass of nanocellulose (solid content) containing a sulfuric acid group and/or a sulfo group together with a carboxyl group. The pH was 3, and the anionic functional group content of the nanocellulose was 1.3 mmol/g. Using the gas-barrier composition-containing dispersion liquid, a gas-barrier product comprising a mixture containing the gas-barrier composition and the polyvalent cationic resin was produced in the same manner as in Example 8. The coating amount as a solid content of nanocellulose was 1.0 g/m².

Example 10

A gas-barrier composition-containing dispersion liquid containing 1% by mass of nanocellulose (solid content) containing a sulfo group and/or a sulfuric acid group was prepared in the same manner as in Example 6. The pH was 3, and the anionic functional group content of the nanocellulose was 0.1 mmol/g. Using the gas-barrier composition-containing dispersion liquid, a gas-barrier product comprising a mixture containing the gas-barrier composition and the polyvalent cationic resin was produced in the same manner as in Example 5. The coating amount as a solid content of nanocellulose was 1.0 g/m².

The gas-barrier product was coated with a coating liquid prepared by mixing an epoxy-based resin, a polyamine-based resin, methanol and ethyl acetate at a blend ratio of 100:320:997:123 (weight) to form an adhesive layer (wet film thickness: 11 μm). Later, a PE film was laminated on the adhesive layer and allowed to stand for 48 hours at 50° C. to cure the adhesive layer.

Example 11

A phosphoric acid solution was prepared by dissolving 24 g of urea and 9 g of ammonium dihydrogen phosphate in 27 g of ion-exchanged water. To this phosphoric acid solution, 5 g of cellulose nanocrystal (solid content) prepared by decomposing pulp with 64 mass % sulfuric acid was added and a dispersion treatment was conducted. The cellulose nanocrystal dispersion liquid was heated at 165° C. for 60 minutes using a multiple safety dryer (manufactured by Futaba Science Co., Ltd.) while evaporating the cellulose nanocrystal dispersion liquid, and the cellulose nanocrystal was subjected to a hydrophilization treatment. Thereafter, 100 ml of ion-exchanged water was added and a dispersion treatment was conducted, and then, washing was conducted using an ultracentrifuge (50000 rpm, 10 minutes). Further, ion-exchanged water and a sodium hydroxide solution were added to adjust pH to 12, and washing was conducted using the ultracentrifuge (50000 rpm, 10 minutes) while adding ion-exchanged water until the pH reached 8. Thereafter, it was placed in the interior of a dialysis membrane (manufactured by Spectrum Laboratories P.L.C., fractionated molecular weight: 3500 to 5000 D) and allowed to stand in ion-exchanged water to remove impurities and the like, thereby preparing the nanocellulose-containing dispersion liquid. Ion-exchanged water was added to the purified nanocellulose-containing dispersion liquid and a dispersion treatment was conducted, whereby a nanocellulose-containing dispersion liquid containing 1% by mass of nanocellulose (solid content) was obtained. The anionic functional group content of nanocellulose was 2.1 mmol/g. Next, 10 parts by mass of anhydrous citric acid, 2 parts by mass of sulfuric acid, 30 parts by mass of synthetic mica (hydrophilic swellable mica, manufactured by Katakura & Co-op Agri Corporation) and 30 parts by mass of polyvinyl alcohol (completely-saponified type, manufactured by Kuraray Co., Ltd.) were added to 100 parts by mass of nanocellulose (solid content) and stirred to prepare a gas-barrier composition-containing dispersion liquid containing 1% by mass of nanocellulose. Using the gas-barrier composition-containing dispersion liquid, a gas-barrier product comprising the gas-barrier composition was produced in the same manner as in Example 1. The coating amount as a solid content of nanocellulose was 1.0 g/m².

Comparative Example 1

To an aqueous dispersion liquid of 10 g of craft pulp (solid content), 0.8 mmol of TEMPO catalyst (manufactured by Sigma Aldrich Co., LLC) and 12.1 mmol of sodium bromide were added, to which ion-exchanged water was further added for filling a 1 L volumetric flask, and the liquid was stirred to be homogeneously dispersed. Later, 15 mmol of sodium hypochlorite was added per gram of cellulose in the reaction system so as to initiate an oxidation reaction. During the oxidation reaction conducted at 30° C. for 4 hours, the pH in the system was kept in a range of 10.0 to 10.5 with 0.5 N sodium hydroxide aqueous solution. The thus oxidized cellulose was washed sufficiently using a high-speed cooling centrifuge (16500 rpm, 10 minutes) while adding ion-exchanged water until the pH reached neutral. After the washing, water was added to the oxidized cellulose to adjust to 1% by mass, which was then subjected to a defibration treatment with a mixer (7011JBB manufactured by Osaka Chemical Ind. Co., Ltd.) so as to prepare a nanocellulose-containing dispersion liquid containing carboxyl groups. The nanocellulose-containing dispersion liquid was coated in the same manner as in Example 1, thereby producing a gas-barrier product. The coating amount as a solid content of nanocellulose was 1.0 g/m².

Comparative Example 2

An oxidized cellulose was treated in a manner similar to that in Comparative Example 1. To this oxidized cellulose, 10 parts by mass of anhydrous citric acid, 2 parts by mass of sulfuric acid, 10 parts by mass of synthetic mica and 10 parts by mass of polyvinyl alcohol were added per 100 parts by mass of the nanocellulose (solid content), thereby preparing a nanocellulose-containing dispersion liquid containing carboxyl groups. The nanocellulose-containing dispersion liquid was coated in the same manner as in Comparative Example 1, thereby producing a gas-barrier product. The coating amount as a solid content of nanocellulose was 1.0 g/m².

Comparative Example 3

Cellulose nanocrystal was prepared by decomposing pulp with 64% by mass of sulfuric acid, and 1 g of the cellulose nanocrystal (solid content) was incorporated into ion-exchanged water so as to conduct a dispersion treatment, so that a nanocellulose-containing dispersion liquid containing a sulfuric acid group and/or a sulfo group was prepared. The nanocellulose-containing dispersion liquid was coated in the same manner as in Example 1, thereby producing a gas-barrier product. The coating amount as a solid content of nanocellulose was 1.0 g/m².

TABLE 1

|  |  | Example 1 | Example 2 | Example 3 | Example 4 | Example 5 | Example 6 |
|---|---|---|---|---|---|---|---|
| Gas-barrier composition | Material | CNC*1 | CNC*1 | CNC*1 | CNC*1 | CNC*1 | CNC*1 |
|  | Type of anionic functional group of nanocellulose/ content (mmol/g) | Sulfuric acid group and/or sulfo group/0.7 | Sulfuric acid group and/or sulfo group/0.7 | Sulfuric acid group and/or sulfo group/0.7 | Sulfuric acid group and/or sulfo group/0.7 | Sulfuric acid group and/or sulfo group/0.1 | Sulfuric acid group and/or sulfo group/0.1 |
|  | Reactive cross-linking agent | CA*2 | CA*2 | CA*2 | CA*2 | CA*2 | CA*2 |
|  | Catalyst | $H_2SO_4$*3 | $H_2SO_4$*3 | $H_2SO_4$*3 | $H_2SO_4$*3 | $H_2SO_4$*3 | $H_2SO_4$*3 |
|  | Layered inorganic compound |  |  | MC*4 | MC*4 |  | MC*4 |
|  | Hydroxyl group-containing polymer |  |  | PVA*5 | PVA*5 |  | PVA*5 |
|  | Substrate | Biaxially-stretched PET | Biaxially-stretched PET | Biaxially-stretched PET | Biaxially-stretched PET | Biaxially-stretched PET | Biaxially-stretched PET |
| Gas-barrier product | Gas-barrier layer | Gas-barrier composition | Gas-barrier composition + PEI mixture layer | Gas-barrier composition | Gas-barrier composition + PEI mixture layer | Gas-barrier composition + PEI mixture layer | Gas-barrier composition + PEI mixture layer |
|  | Oxygen permeability *6 cc/m² · day · atm | 13.8 | 18.5 | 3.4 | 3.8 | 3.9 | 0.1 |

*1 Cellulose nanocrystal treated with sulfuric acid
*2 10 parts by mass of anhydrous citric acid, added to 100 parts by mass of nanocellulose (solid content)
*3 2 parts by mass of sulfuric acid, added to 100 parts by mass of nanocellulose (solid content)
*4 10 parts by mass of synthetic mica, added to 100 parts by mass of nanocellulose (solid content)
*5 10 parts by mass of polyvinyl alcohol, added to 100 parts by mass of nanocellulose (solid content)
*6 Oxygen permeability of gas-barrier composition when coating amount of nanocellulose is 1 g/m² (23° C., 50% RH)

TABLE 2

|  |  | Example 7 | Example 8 | Example 9 | Example 10 | Example 11 |
|---|---|---|---|---|---|---|
| Gas-barrier composition | Material | CNC*1 | → | → | → | → |
|  | Type of anionic functional group of nanocellulose/ content (mmol/g) | Sulfuric acid group and/or sulfo group, phosphoric acid group/0.3 | Sulfuric acid group and/or sulfo group, carboxyl group/1.3 | Sulfuric acid group and/or sulfo group, carboxyl group/1.3 | Sulfuric acid group and/or sulfo group/0.1 | Sulfuric acid group and/or sulfo group, phosphoric acid group/2.1 |
|  | Reactive cross-linking agent | CA*2 | CA*2 | CA*2 | CA*2 | CA*2 |
|  | Catalyst | $H_2SO_4$*3 | $H_2SO_4$*3 | $H_2SO_4$*3 | $H_2SO_4$*3 | $H_2SO_4$*3 |
|  | Layered inorganic compound | MC*4 |  | MC*4 | MC*4 | MC*7 |
|  | Hydroxyl group-containing polymer | PVA*5 |  | PVA*5 | PVA*5 | PVA*8 |
|  | Substrate | Biaxially-stretched PET | Biaxially-stretched PET | Biaxially-stretched PET | Biaxially-stretched PET | Biaxially-stretched PET |
| Gas-barrier product | Gas-barrier layer | Gas-barrier composition + PEI mixture layer | Gas-barrier composition + PEI mixture layer | Gas-barrier composition + PEI mixture layer | Gas-barrier composition + PEI mixture layer | Gas-barrier composition + PEI mixture layer |
|  | Adhesive layer |  |  |  | Epoxy resin and polyamine resin curing reaction product |  |
|  | Oxygen permeability*6 cc/m² · day · atm | 0.5 | 3.4 | 0.6 | 0.1 | 0.05 |

*1 Cellulose nanocrystal treated with sulfuric acid
*2 10 parts by mass of anhydrous citric acid, added to 100 parts by mass of nanocellulose (solid content)
*3 2 parts by mass of sulfuric acid, added to 100 parts by mass of nanocellulose (solid content)
*4 10 parts by mass of synthetic mica, added to 100 parts by mass of nanocellulose (solid content)
*5 10 parts by mass of polyvinyl alcohol, added to 100 parts by mass of nanocellulose (solid content)
*6 Oxygen permeability of gas-barrier composition when coating amount of nanocellulose is 1 g/m² (23° C., 50% RH)
*7 30 parts by mass of synthetic mica, added to 100 parts by mass of nanocellulose (solid content)
*8 30 parts by mass of polyvinyl alcohol, added to 100 parts by mass of nanocellulose (solid content)

TABLE 3

|  |  | Comparative Example 1 | Comparative Example 2 | Comparative Example 3 |
|---|---|---|---|---|
| Gas-barrier composition | Material | Pulp | Pulp | CNC[*1] |
|  | Type of anionic functional group of nanocellulose/ content (mmol/g) | Carboxyl group/1.3 | Carboxyl group/1.3 | Sulfuric acid group and/or sulfo group/0.1 |
|  | Reactive crosslinking agent | CA[*2] | CA[*2] |  |
|  | Catalyst | $H_2SO_4$[*3] | $H_2SO_4$[*3] |  |
|  | Layered inorganic compound |  | MC[*4] |  |
|  | Hydroxyl group-containing polymer |  | PVA[*5] |  |
|  | Substrate | Biaxially-stretched PET | Biaxially-stretched PET | Biaxially-stretched PET |
| Gas-barrier product | Gas-barrier layer | Gas-barrier composition | Gas-barrier composition | Gas-barrier composition + PEI mixture layer |
|  | Oxygen permeability[*6] $cc/m^2 \cdot day \cdot atm$ | 80 | 80 | 80 |

[*1] Cellulose nanocrystal treated with sulfuric acid
[*2] 10 parts by mass of anhydrous citric acid, added to 100 parts by mass of nanocellulose (solid content)
[*3] 2 parts by mass of sulfuric acid, added to 100 parts by mass of nanocellulose (solid content)
[*4] 10 parts by mass of synthetic mica, added to 100 parts by mass of nanocellulose (solid content)
[*5] 10 parts by mass mass of polyvinyl alcohol, added to 100 parts by mass of nanocellulose (solid content)
[*6] Oxygen permeability of gas-barrier composition when coating amount of nanocellulose is 1 $g/m^2$ (23° C., 50% RH)

INDUSTRIAL APPLICABILITY

The gas-barrier composition of the present invention can form a dense crosslinked structure in which nanocellulose is homogeneously dispersed, and it has excellent gas-barrier properties, and thus, the gas-barrier composition can be used as a coating agent capable of imparting gas-barrier properties. Further, the gas-barrier composition of the present invention is mixed with a polyvalent cationic resin to prepare a mixture constituting a product, and the product is capable of exhibiting gas-barrier properties superior to the gas-barrier properties exhibited by the gas-barrier composition alone. The product can be used as a gas-barrier film. Alternatively, since the interfacial peeling strength relative to a hydrophobic substrate comprising a thermoplastic resin can also be improved, it can be used suitably as a gas-barrier laminate.

The invention claimed is:

1. A gas-barrier composition comprising: cellulose nanocrystal containing at least one of a sulfuric acid group or a sulfo group; and a reactive crosslinking agent, wherein the reactive crosslinking agent is polyvalent carboxylic acid and is present in an amount of 10 to 30 parts by mass per 100 parts by mass of the cellulose nanocrystal (solid content).

2. The gas-barrier composition according to claim 1, further comprising a layered inorganic compound in an amount of 5 to 30 parts by mass per 100 parts by mass of the nanocellulose (solid content).

3. The gas-barrier composition according to claim 1, further comprising a hydroxyl group-containing polymer in an amount of 5 to 30 parts by mass per 100 parts by mass of the nanocellulose (solid content).

4. The gas-barrier composition according to claim 1, wherein the polyvalent carboxylic acid is citric acid.

5. The gas-barrier composition according to claim 1, wherein the nanocellulose contains anionic functional groups in an amount of 0.1 to 4.0 mmol/g.

6. A gas-barrier product comprising a mixture containing the gas-barrier composition according to claim 1 and a polyvalent cationic resin, wherein the mixture forms a layer of the gas-barrier composition on a layer of the polyvalent cationic resin so that the polyvalent cationic resin and the nanocellulose are mixed with each other.

7. The gas-barrier product according to claim 6, wherein the polyvalent cationic resin is polyethyleneimine.

8. A gas-barrier laminate comprising a gas-barrier layer of the gas-barrier product according to claim 6, the gas-barrier layer being formed on a substrate.

9. The gas-barrier laminate according to claim 8, wherein a moisture-resistant resin layer is formed on the gas-barrier layer via an adhesive layer comprising both an epoxy resin and a polyamine resin.

* * * * *